United States Patent [19]

Beardmore

[11] 3,983,793
[45] Oct. 5, 1976

[54] CROSSHEAD PISTON ASSEMBLY

[75] Inventor: John M. Beardmore, South Lyon, Mich.

[73] Assignee: General Motors Corporation, Detroit, Mich.

[22] Filed: Dec. 8, 1975

[21] Appl. No.: 638,637

[52] U.S. Cl. .................................. 92/190; 92/126; 92/195; 92/212
[51] Int. Cl.² ....................... F16J 1/02; F16J 1/04; F16J 1/14
[58] Field of Search ............. 92/215, 187, 212, 195, 92/190, 126, 214, 193, 208, 249; 123/193 P

[56] References Cited
UNITED STATES PATENTS

| | | | |
|---|---|---|---|
| 1,283,865 | 11/1918 | Nacker | 92/212 |
| 1,847,731 | 3/1932 | Solenberger | 92/126 X |
| 1,944,935 | 1/1934 | Jardine | 92/126 |
| 2,977,764 | 4/1961 | Matthews | 92/85 R |
| 3,115,070 | 12/1963 | Tsang | 92/212 |
| 3,158,072 | 11/1964 | Detrez | 92/187 |
| 3,505,934 | 4/1970 | De Biasse | 92/212 X |
| 3,555,972 | 1/1971 | Hulsing | 92/190 X |
| 3,906,923 | 9/1975 | Harker | 92/212 X |

FOREIGN PATENTS OR APPLICATIONS 500,055  12/1919  France ................................. 92/249

Primary Examiner—Irwin C. Cohen
Attorney, Agent, or Firm—Ronald L. Phillips

[57] ABSTRACT

An internal combustion engine crosshead piston assembly having an outer skirt mounted by an elastomeric member on an inner skirt to reduce piston-slap-caused noise wherein expansible chambers are provided in the elastomeric member and are connected by orifices in the inner skirt to receive and eject oil to provide cooling of the outer skirt and also add a damping effect to further reduce the noise.

2 Claims, 5 Drawing Figures

CROSSHEAD PISTON ASSEMBLY

This invention relates to an internal combustion engine crosshead piston assembly and more particularly to such an assembly wherein the piston thrust stiffness is reduced by an elastomeric arrangement to effect reduction in piston-slap-caused noise while very efficient cooling is maintained.

It has been found that in certain internal combustion engines, such as two-cycle diesel engines, that the most significant mechanical noise source within the engine structure is that caused by piston slap. Thus, a significant noise reduction in such a total engine package could be effected by first reducing or lowering the piston slap noise. In this environment there are several important parameters to consider; namely, piston-to-liner clearance, piston-to-liner motion damping, piston mass and piston thrust stiffness. This assumes no changes in combustion characteristics (namely peak pressure) or engine speed.

Of these parameters, a reduction in the piston thrust stiffness would be particularly effective if it was possible to somehow provide a relatively low rate spring in the skirt structure. In most piston designs, however, the skirt is also required to act as a heat transfer medium between the piston and liner and as a result there is imposed an unsatisfactory limit on reduction in skirt stiffness from a noise standpoint but it was found that in certain crosshead piston designs this is not the case. For example, in the crosshead piston disclosed in U.S. Pat. No. 3,555,972 assigned to the assignee of this invention, actual temperature measurements have shown that good piston cooling can be effectively accomplished by the forced feeding of lubricating oil with resulting skirt temperatures only slightly above the oil sump temperature. The present invention takes advantage of the structural and temperature characteristics of crosshead piston assemblies of this type to provide a very simple arrangement with a substantially reduced thrust stiffness brought about by a built-in relatively low spring rate, support-hydraulic energy absorber for the skirt that is effective to reduce the piston slap noise without substantially increasing the lowered skirt temperature.

In the crosshead piston assembly of the present invention, there is a cylindrical head member of relatively high strength material and a cylindrical inner skirt member of relatively light weight material which are independently pivotally connected by a piston pin to a piston rod, there being slight angular movement permitted between the head and inner skirt. The inner skirt is provided with an outer annular recess in which a cylindrical relatively thin wall outer skirt member having an outer surface of relatively high wear resistant material is mounted with limited relative axial movement. A cylindrical elastomeric member is arranged in the recess between the two skirt members and is bonded on opposite sides to these members. The outer skirt member extends substantially radially outward of the head member and the inner skirt member to contact with the cylinder wall and the elastomeric member is effective to both distribute and transmit any radial thrust loads acting on the inner skirt member to the outer skirt member with a relatively low spring rate and relatively high energy absorption to thereby reduce piston-slap-caused noise. In addition, the elastomeric member is provided with longitudinally extending expansible chambers that are connected by orifices in the inner skirt to receive oil from and eject oil to the piston interior to provide cooling of the outer skirt and also add a damping effect to further reduce the noise.

An object of the present invention is to provide a new and improved crosshead piston assembly.

Another object is to provide an improved internal combustion engine crosshead piston assembly having an elastomerically mounted skirt that reduces piston-slap-caused noise without substantially increasing skirt temperature.

Another object is to provide in an internal combustion engine crosshead piston assembly an outer skirt mounted on an inner skirt by an elastomeric member with expansible oil chambers that is effective to both distribute and transmit any radial thrust loads acting on the inner skirt to the outer skirt with a relatively low spring rate and relatively high energy absorption to thereby reduce piston-slap-caused noise while oil circulating through the chambers via orifices in the inner skirt cools the outer skirt and also provides a damping effect to further reduce the noise.

These and other objects of the present invention will be more apparent from the following description and drawing in which.

Figure 1:
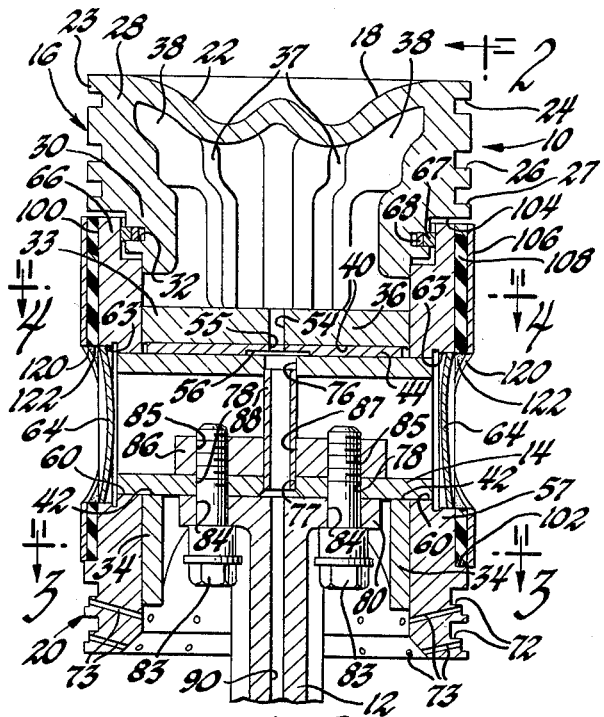
FIG. 1 is a longitudinal sectional view of a piston and connecting rod assembly embodying the present invention.
Figure 2:
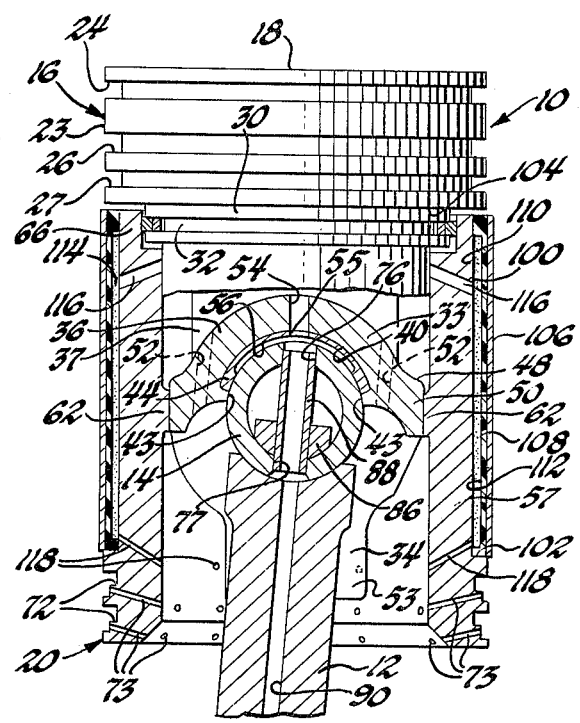
FIG. 2 is a view taken along the line 2—2 in FIG. 1.
Figure 3:
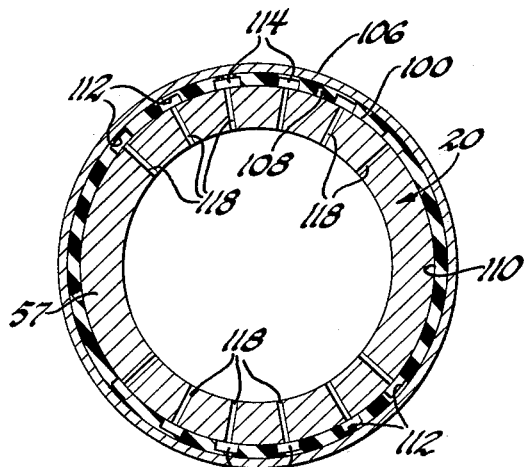
FIG. 3 is a view taken along the line 3—3 in FIG. 1.
Figure 4:
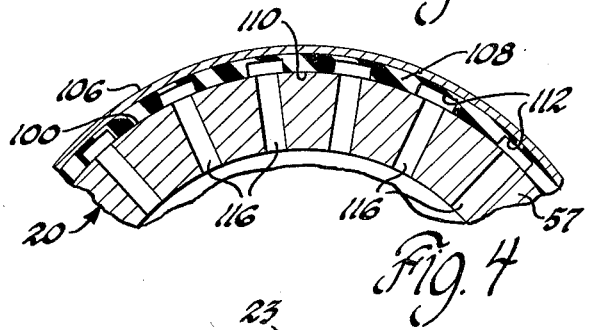
FIG. 4 is an enlarged view taken along the line 4—4 in FIG. 1.
Figure 5:
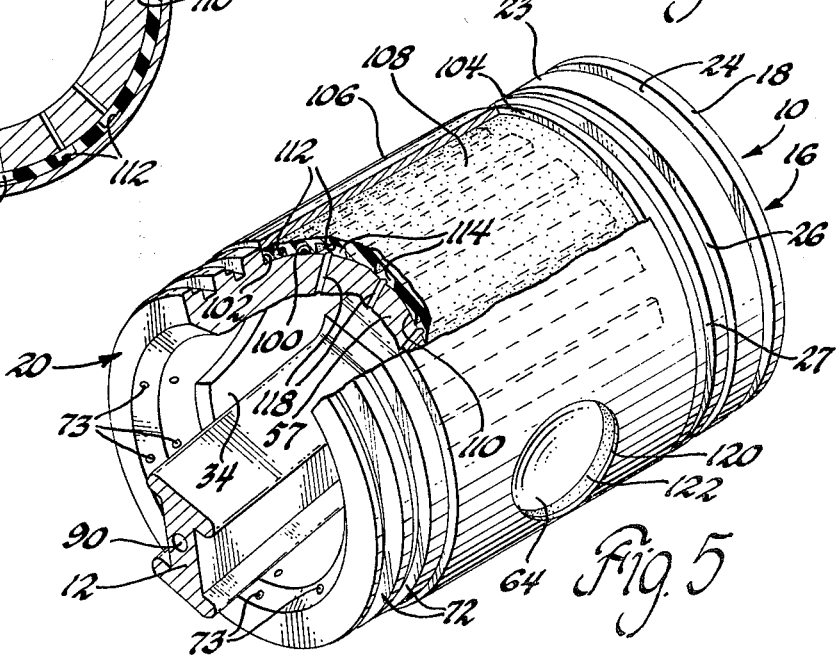
FIG. 5 is a perspective view of the piston and connecting rod assembly.

A preferred embodiment of the present invention is disclosed in detail in a piston and rod assembly generally designated as 10 for use in current high output engines, especially diesel engines. As best shown in FIGS. 1 and 2, the assembly 10 includes a connecting rod 12, the lower portion of which has been deleted to simplify the drawing, a piston pin 14 and a piston assembly 16. The piston assembly includes two primary elements—a head membeer 18 and a skirt, or crosshead assembly 20.

The piston head member includes a crown section 22 extending over the upper surface and forming a combustion chamber defining wall. Depending from the outer edge of the crown section is an outer annular ring belt section 23 in which are formed three compression ring grooves including a top, or fire, ring groove 24 at the juncture of the crown and ring belt sections and second and third compression ring grooves 26 and 27 respectively located in a lower part of the ring belt section and separated from the top ring groove 24 by a thinner walled heat dam portion 28. Below the third ring groove 27, the ring belt section terminates in a reduced diameter portion 30 which includes a seal ring groove 32.

The piston head member further includes a piston pin connecting section 33 generally comprising a pair of spaced, downwardly extending, pin encircling arms 34 interconnected at their upper ends by a saddle portion 36 which is in turn connected with the crown section by a plurality of axially and radially extending struts or columns 37. Columns 37 include radially outwardly extending rib portions 38 integrally connecting them with the ring belt section and with the outer portions of the crown section.

Saddle portion 36 defines a downwardly opening part-cylindrical recess 40 coaxially aligned transversely of the piston axis with a pair of piston pin receiving openings 42 formed in pin encircling arms 34. Recess 40 terminates circumferentially in a pair of radial shoulders 43 which are adapted to retain in the recess a part-cylindrical bearing insert 44 having an inwardly facing bearing surface preferably containing a plurality of grooves (not shown) for the distribution of lubricant thereover. A retainer tang (not shown) at one edge of insert 44 is deformably received in a recess of the saddle portion to retain the insert from movement along its axis after installation. Between arms 34 and adjacent recess 40 the saddle portion is flared outwardly as at 48 and terminates in a depending rim 50. Oil drain openings 52 are drilled vertically through the outwardly flared portions 48. At the lower ends of arms 34, excess material 53 is provided which may be removed as desired in order to obtain the proper weight and balance of assembly. Cooling oil supply openings 54 and 55 are provided in the centers of the saddle portion and bearing insert respectively, the latter also having an arcuate recess 56 in its inner surface connecting with opening 55 and with oil distribution grooves (not shown) extending over the bearing surface.

The crosshead or skirt assembly 20 includes a cylindrical skirt member 57 having cylindrical pin receiving openings 60 which, when the head member and skirt unit are assembled, are coaxially aligned with the pin encircling openings 42 of the head member pin connecting section. Between the openings 60 interior of the skirt there are provided circumferentially and radially inwardly extending ribs 62. Shallow counterbores 63 are provided near the outer ends of the pin receiving openings 60 to receive metal closure plates 64.

At its upper end, the skirt 57 is counterbored to form an annular shoulder or wall portion 66 which, in assembly, surrounds the reduced diameter portion 30 of the head member ring belt section. A relatively small clearance is provided between them and this is sealed by suitable means such as a metal seal ring 67 which includes overlapping ends to close the end gap. The seal ring is received in the ring groove 32 of the head member and is expanded by a conventional spring piston ring expander 68.

At its lower end, skirt 57 has two oil ring grooves 72 to provide for receiving suitable oil scraper rings to control the amount of oil on the engine cylinder walls. Below each groove 72 are a plurality of oil drain holes 73 to carry oil away from the oil rings in a conventional manner.

The head and skirt of the piston assembly are retained together by the cylindrical piston pin 14 which is received in openings 60, 42 of the skirt and head members respectively and engages, across a substantial portion of the pin's upper surface, the bearing insert 44 retained within recess 40. Piston pin 14 is hollow and has oppositely disposed upper and lower radial openings 76 and 77 respectively. On opposite sides of lower opening 77, a pair of bolt clearance openings 78 are also provided.

The piston pin 14 is secured against the saddle portion 80 of the connecting rod 12 by bolts 83 which extend through openings 84 in the rod and openings 78 in the piston pin into engagement with threaded openings 85 in an elongated nut 86 disposed within the piston pin 14. If desired, the connecting rod and nut may be arranged in a known manner so as to prestress the pin by deforming it into an oval shape in its unloaded condition. Nut 86 also includes a central opening 87 which is aligned with openings 76 and 77 of the pin and together with them receives a tube member 88 for the purpose of providing a transverse oil passage through the pin. In assembly, the passage formed by tube 88 aligns with a drilled passage 90 extending lengthwise through the connecting rod 12.

In typical piston operation, oil is supplied from the engine lubricating oil system through a drilled passage 90 in the connecting rod and tube 88 in the piston pin to recess 56 of the bearing insert, from which part of the oil is distributed over the surface of the insert through the distributing grooves (not shown) for lubricating the bearing surface. The majority of the oil supplied continues upward through openings 55 and 54 of the bearing insert and piston head saddle respectively and enters the undercrown cavity of the piston in which it is sloshed against the underside of the crown by the reciprocating motion of the piston. This action provides cooling of the crown, ring belt and connecting columnar ribs of the piston head structure. The oil is prevented from freely draining out of the undercrown cavity by cooperation of the saddle portion of the piston head with the ribs 62 of the piston skirt, the latter of which fit closely around the depending rim 50 of the outwardly flared part of the saddle portion. Instead, the drain openings 52 provide for controlled drainage of cooling oil from the undercrown cavity.

Closure plates 64 prevent leakage of the oil, used to lubricate the pin, from the ends of the pin receiving openings and onto the piston skirt. Drain openings (not shown) provide for the return to the engine crankcase of any oil collecting at ends of the piston pin.

The structure thus far described is of known type and may have further details as disclosed in the aforementioned U.S. Pat. No. 3,555,972. In such an assembly it has been found that piston slap is the most significant mechanical noise source within the engine structure. Thus, significant noise reductions in the total engine package could be effected by first reducing the piston slap noise. One way to reduce piston slap noise is to reduce piston thrust stiffness which requires building a relatively low spring rate into the skirt structure. But on most piston designs the skirt acts as a heat transfer path between the piston and cylinder. However, it has been found that in the crosshead piston of the above type this is not the case with actual temperature measurements having shown that piston cooling is effectively accomplished by forced feeding of the lubricating oil. For example, it has been found in such piston assemblies that the resulting skirt temperatures were only about 10° F. above an oil sump temperature of 250° F. or about 260° F. In some areas the cylinder is hotter than this and in the case of a turbocharged engine the air going into the cylinder may be even hotter, for example about 300° F. at rated power outputs.

The fact that the piston head and skirt are separately connected to the piston pin permits a small amount of relative motion between them so that movements of the piston skirt, caused by its natural motion from side to side in the cylinder as it absorbs the thrust loads placed upon the piston by oscillation of the connecting rod, are not transmitted to the piston head portion. Thus, the head portion is subjected essentially only to the combustion and inertia forces which act along the axis of the engine cylinder. This permits the piston head to take a relatively fixed position within the engine cylinder and avoids unnecessary shifting and wear of the piston rings within the grooves. The axial combustion and downward inertia loads are distributed over substantially the entire upper surface of the piston pin by its contact with the insert bearing received within the part cylindrical recess of the piston saddle portion. These features combine to provide a high capacity piston construction capable of operating under high temperatures with high loads and providing excellent conditions for extended operation of the skirt and head portions as well as the piston pin bearing.

According to the present invention an elastomeric outer skirt mounting arrangement with hydraulic damping is utilized to reduce noise caused by piston slap against the cylinder resulting from the thrust loads and without substantially increasing skirt temperature. This modification comprises providing the normal skirt 57 with a reduced diameter portion 100 which terminates at its lower end with a radially extending shoulder 102 below the piston pin receiving openings 60 and terminates at its upper end beneath the radially extending shoulder 104 of the piston head's ring belt section 23. The reduced diameter portion 100 with its shoulder 102 cooperates with the piston head shoulder 104 to form a radially outwardly facing annular recess on the skirt member 57 in which a cylindrical relatively thin wall outer skirt member 106 is located. A cylindrical, relatively low spring rate, hydraulic damper member 108 of elastomeric material such as rubber is located in the recess between the two skirt members 57 and 106 and is bonded on opposite sides to these members, the outer skirt member 106 and elastomeric spring member 108 being mounted on what can now be called the inner skirt member 57 prior to assembly of the latter with the piston head and piston pin.

The elastomeric spring-hydraulic damper member 108 is provided on its internal cylindrical surface 110 in the piston's diagonally opposite thrust regions with axially extending, angularly spaced, voids or recesses 112 which cooperate with the cylindrical surface 100 of the inner skirt to provide expansible oil chambers 114 which extend radially outward close to the inner surface of the outer skirt 106. The chambers 114 terminate near the ends of the elastomeric member 108 and extend substantially the length of the outer skirt member 106. The inner skirt member 57 is provided near the top thereof with relatively large orifices 116 through the skirt wall. The orifices 116 open at their radially outer end to the expansible oil chambers 114 near the top thereof while the inner end of these orifices open to the undercrown cavity of the piston assembly above the piston pin connecting section 33 in the region where oil is being force fed via opening 54 in the piston head saddle 36. In addition, the inner skirt member 57 is provided near the bottom thereof with relatively small orifices 118 which extend through the inner skirt wall and open at their radially outer end to the expansible oil chambers 114 near the bottom thereof. The radially inner end of the small orifices 118 opens to the interior of the piston assembly below the piston pin connecting section 33 and thus to the return path that the oil takes to the sump. In addition, the outer skirt member 106 and the elastomeric spring-hydraulic damper member 108 are provided with openings 120 and 122 to leave open the closure plates 64.

The thus elastomerically mounted outer skirt member 106 which may be either performed and then bonded in place or may be injection molded in situ and cured, extends substantially radially outwardly of the piston head's ring belt section 23 and the remaining oil ring groove portion of the inner skirt member 57 so that it has a sliding bearing fit in the cylinder that helps to maintain clearance between the cylinder and both the head member and inner skirt member. As a result, when there occurs a thrust load, the elastomeric spring characteristic of the mounting or suspension member 108 with the displacement allowed by the chambers or voids 114 is effective to both distribute and transmit the thrust loads from the inner skirt member 57 to the outer skirt member 106 with a relatively low spring rate and relatively high energy absorption factor to thereby reduce piston-slap-caused noise. For example, the allowed motion of the outer skirt member 106 may be based upon a thrust caused compression of the elastomeric spring member 108 of 0.010 to 0.015 inch in either direction from the center position shown in FIG. 2. And to withstand typical maximum thrust loads of about 1,000 pounds, the spring rate required of the elastomer at maximum deflection would be only about 66,000 to 100,000 pounds per inch. In contrast, the spring rate of a single skirt member would be about 0.5 to 1.0 million pounds per inch. The difference between the elastomerically mounted outer skirt and a conventional single skirt is even more pronounced when considering that the spring rate during the first 0.001 inch of motion could be as low as 1,000 pounds per inch with this skirt and elastomer sandwich arrangement.

Furthermore, the outer skirt 106 can be made very thin in comparison with the inner skirt so that it can easily deform to the cylindrical shape giving better bearing contact than the normal single skirt. Preferably the outer skirt is tin plated or malleable plated iron while the inner skirt may be made of aluminum for lightness as compared with the common practice of normally forming it from cast iron the same as the piston member. But it will be appreciated that the primary purpose of elastomerically mounting the outer skirt is to soften the blows of piston slap and thereby reduce noise rather than provide sealing which is primarily left to the oil rings which are still mounted in the lower portion of the inner skirt.

However, elastomer is a relatively poor heat conductor and this could result in an outer skirt temperature substantially higher than that in a single skirt design. But this is prevented by the expansible oil chambers 114 which provide for cooling of the outer skirt and also provide a damping effect to further reduce the piston slap noise as will now be described. With the forced oil feed to the undercrown cavity of the piston assembly some of this oil flows through the large orifices 116 into the top of the expansible oil chambers 114 and then out through the smaller orifices 118 in the bottom thereof after thus having traveled substantially the length and area of the elastomeric member 108 in the thrust regions of the outer skirt. This oil flowing through the chambers 114 acts as a cooling medium within the elastomer and between the two skirts and effectively carries away the heat of the outer skirt to prevent it from developing excessive temperatures, the smaller orifices acting to retard this coolant flow and maintain the chambers substantially continuously full of the cooling oil. For increased cooling, it will be understood that the voids 112 in the elastomer could be extended radially outwardly so that the inner surface of the outer skirt 106 then forms the outer wall of the expansible chambers. In that case, the cooling oil would then have direct contact with the outer skirt that it is cooling. Furthermore, on radial thrust load impacts which cause the noise, the chambers 114 will contract forcing oil out the orifices 116 and 118 and thus act as small shock-absorbers or dampers thereby effecting further reduction in the piston-slap-caused noise. In one actual construction which maintained low outer skirt temperatures while substantially lowering the piston-slap-caused noise, the large orifices 116 were drilled holes having a 1/8 inch diameter and the small orifices were drilled holes having a 1/16 inch diameter. Of course, these sizes will vary with the usage.

The above described embodiment is illustrative of the invention which may be modified within the scope of the appended claims.

I claim:

1. An internal combustion engine crosshead piston assembly comprising a head member, a cylindrical inner skirt member, a piston pin for pivotally connecting both said head member and said inner skirt member to a piston rod while permitting relatively small angular movement between these members, said inner skirt member having an outer annular recess, a cylindrical outer skirt member arranged in said recess, a cylindrical elastomeric member arranged in said recess between said skirt members, said elastomeric member having an inner side bonded to said inner skirt member and an outer side bonded to said outer skirt member, said elastomeric member further having longitudinally extending expansible chambers that change in volume with changing radial thrust loads, flow restricting passages in said inner skirt member connecting each said chamber at longitudinally spaced points to the interior of said inner skirt member, and said outer skirt member extending substantially radially outwardly of both said head member and said inner skirt member whereby said elastomeric member is effective to both distribute and transmit any radial thrust loads acting on said inner skirt member to said outer skirt member with a relatively low spring rate and relatively high energy absorption factor to thereby reduce piston-slap-caused noise while a portion of any oil splashing within the piston assembly is circulated through said chambers to cool said outer skirt member and also add a damping effect on chamber contraction to further reduce piston-slap-caused noise.

2. An internal combustion engine crosshead piston assembly comprising a head member, a cylindrical inner skirt member, a piston pin for pivotally connecting both said head member and said inner skirt member to a piston rod while permitting relatively small angular movement between these members, said inner skirt member having an outer annular recess, a cylindrical outer skirt member arranged in said recess, a cylindrical elastomeric member arranged in said recess between said skirt members, said elastomeric member having an inner side bonded to said inner skirt member and an outer side bonded to said outer skirt member, said elastomeric member further having longitudinally extending expansible chambers that change in volume with changing radial thrust loads, a large and a small orifice in said inner skirt member connecting each said chamber adjacent the respective upper and lower ends thereof to the interior of said inner skirt member, and said outer skirt member extending substantially radially outwardly of both said head member and said inner skirt member whereby said elastomeric member is effective to both distribute and transmit any radial thrust loads acting on said inner skirt member to said outer skirt member with a relatively low spring rate and relatively high energy absorption factor to thereby reduce piston-slap-caused noise while a portion of any oil splashing within the piston assembly is circulated through said chambers to cool said outer skirt member and also add a damping effect on chamber contraction to further reduce piston-slap-caused noise.

* * * * *